United States Patent
Ito et al.

(10) Patent No.: US 6,993,357 B1
(45) Date of Patent: Jan. 31, 2006

(54) MOBILE RADIO COMMUNICATION TERMINAL

(75) Inventors: Koichi Ito, Tokyo (JP); Kentoku Yamaguchi, Tokyo (JP); Seiichi Okamoto, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 754 days.

(21) Appl. No.: 09/669,860

(22) Filed: Sep. 27, 2000

(30) Foreign Application Priority Data

Sep. 29, 1999  (JP) ............................. P11-276257

(51) Int. Cl.
*H04M 1/00* (2006.01)

(52) U.S. Cl. ................. 455/552.1; 455/553.1; 455/343.1; 455/343.2; 455/572; 455/574; 370/350; 370/328; 370/338; 370/503

(58) Field of Classification Search ................. 455/552, 455/343, 574, 552.1, 553.1, 343.1, 343.2, 455/572, 500, 502, 503; 370/336, 337, 345, 370/347, 348, 350, 328, 338, 503
See application file for complete search history.

(56) References Cited

U.S. PATENT DOCUMENTS 5,537,415 A   7/1996  Miller et al.
5,613,219 A * 3/1997  Vogel et al. ................... 455/78
5,701,337 A * 12/1997 Silver et al. ............. 455/426.1
5,884,188 A * 3/1999  Hayes, Jr.
6,002,709 A * 12/1999 Hendrickson ................ 370/350
6,021,332 A * 2/2000  Alberth, Jr. et al.
6,400,961 B1 * 6/2002 Lillie et al.

FOREIGN PATENT DOCUMENTS

| GB | 2 325 591 | 11/1998 |
| WO | WO 93/25955 | 12/1993 |
| WO | WO 00/22837 | 4/2000 |

\* cited by examiner

*Primary Examiner*—Sinh Tran
*Assistant Examiner*—Huy Nguyen
(74) *Attorney, Agent, or Firm*—Oblon, Spivak, McClelland, Maier & Neustadt, P.C.

(57) ABSTRACT

In a mobile radio communication terminal includes a feeding controller 7 with a feeding control table. In the feeding control table 7 is stored the on/off state of the power to each circuit in correspondence with all operation modes for the apparatus. In case an operation mode is reported from the main control circuit 11 prior to the operation, output Vcc of the power supply circuit 6 is fed to the minimum circuits necessary for execution of the operation mode according to the operation mode and information stored in the feeding control table 7, and power to the remaining circuits is shut off or reduced.

11 Claims, 11 Drawing Sheets

| OPERATION MODE | MAIN CONTROL CIRCUIT | MEMORY | IMAGE PROCESSOR | DISPLAY | CAMERA | AUDIO CODEC | MICRO-PHONE | RECEIVER | W-CDMA RADIO SECTION | VOLTAGE CON-TROLLER | BT RADIO SECTION |
|---|---|---|---|---|---|---|---|---|---|---|---|
| W-CDMA SPEECH COMMUNICATIONS | ○ | ○ | × | ○ | × | ○ | ○ | ○ | ○ | ○ | × |
| BT SPEECH COMMUNICATIONS | ○ | ○ | × | ○ | × | ○ | ○ | ○ | × | × | ○ |
| W-CDMA TELEVISION TELEPHONE COMMUNICATIONS | ○ | ○ | ○ | ○ | ○ | ○ | ○ | ○ | ○ | ○ | × |
| W-CDMA CHARACTER MAIL TRANSMISSION/RECEPTION | ○ | ○ | × | ○ | × | × | × | × | ○ | ○ | × |
| SHOOTING AND PLAYBACK OF AN ANIMATION IMAGE VIA W-CDMA | ○ | ○ | ○ | ○ | ○ | ○ | ○ | ○ | × | × | × |
| BT-TO-PC DATA COMMUNICATIONS | ○ | ○ | × | ○ | × | × | × | × | × | × | ○ |
| W-CDMA IMAGE DATA COMMUNICATIONS | ○ | ○ | ○ | ○ | ① | × | × | × | ○ | ○ | × |
| STATE DISPLAY ON PC VIA BT | ○ | ○ | × | × | × | × | × | × | × | × | ○ |
| W-CDMA INTERNET WEB BROWSING | ○ | ○ | ○ | ○ | × | × | × | × | ○ | ○ | × |
| VOICE RECORDING AND PLAYBACK | ○ | ○ | × | ○ | × | ○ | ○ | ○ | × | × | × |

① ... FOR DATA STOCKED IN MEMORY, THE CAMERA IS GIVEN × MARK
○ MARK FOR DATA COMMUNICATIONS WHILE SHOOTING IMAGES

MOBILE RADIO COMMUNICATION TERMINAL

BACKGROUND OF THE INVENTION

1. Field of the Invention

The present invention relates to a mobile radio communication terminal such as a mobile station and a portable information terminal, and in particular, to a mobile radio communication terminal for selectively using a plurality of radio communication systems to perform radio communication.

2. Description of the Related Art

In recent years, with the development of radio communication technologies and an increase in communication needs, a variety of mobile radio communication terminals have been developed and used. Among these terminals are terminals which allow communication by selectively using a plurality of radio communication systems.

For example, a terminal which selectively uses the TDMA (Time Division Multiple Access) system and the AMPS system, one type of the FDMA (Advanced Mobile Phone System) system, a terminal which selectively uses the PDC (Personal Digital Cellular) system, one type of the TDMA system and the PHS (Personal Handyphone System), and a terminal which selectively uses the CDMA system and the FDMA system are known. Recently, a terminal which selectively uses the W-CDMA (Wideband-Code Division Multiple Access) system and the BT (Bluetooth) system, one of the short-range radio communication standards using the ISM (Industry Science Medical) band has been devised.

However, a terminal of this type conventionally used or devised has a disadvantage that such a terminal has large power consumption because it is generally equipped with circuits each of which is dedicated for each radio communication system, and has considerably shorter battery life than apparatus using a single radio communication system alone. Such a terminal must be provided with a power supply circuit having large power capacity for simultaneous use of a plurality of radio communication systems and thus the terminal had to employ a large-sized power supply circuit as well as large-sized apparatus to prevent overheating.

SUMMARY OF THE INVENTION

The present invention focuses on the aforementioned circumstances. A first object of the invention is to provide a mobile radio communication terminal which suppresses an increase in power consumption as far as possible to extend battery life.

A second object of the invention is to provide a mobile radio communication terminal which can suppress an increase in the power supply circuit capacity to prevent upsizing of the apparatus.

In order to attain the first object, a first aspect of the invention provides a mobile radio communication terminal which can selectively use a plurality of radio communication modes to perform radio communications, said terminal comprising: a plurality of communicating means for individually operating said plurality of radio communication modes; means for selecting communicating means necessary for radio communication via a specified radio communication mode from among said plurality of communicating means; and means for controlling power supply to another communicating means which is not selected in said selecting means by shutting it off or reducing its power supply, during a radio communication period via said specified radio communicating mode.

Thus, according to the first aspect of the invention, communicating means corresponding to the specified radio communication mode is selected prior to radio communication, power is fed to the selected communicating means, and power to other communicating means which were not selected is shut off or reduced. Power is fed to necessary communicating means per radio communication mode used. This suppresses useless power consumption and thus allows battery life to be extended.

In order to attain the first purpose, a second aspect of the invention provides a mobile radio communication terminal comprising: first communicating means for operating a first radio communication mode with a first radio communication period depending on a distant apparatus; second communicating means for operating a second radio communication mode with a second radio communication period which can be set by an originating apparatus; and communication period setting means for making at least part of the second radio communication period coincide with the first radio communication period.

Specifically, the mobile radio communication terminal according to the second aspect of the invention is configured so that, via the communication period setting means, the wait operation according to the second radio communication mode can start in synchronization with the wait operation start timing according to the first radio communication mode.

According to the second aspect of the invention, at least part of the wait operation according to the second radio communication mode is performed within the wait operation according to the first radio communication mode. This shortens the operation time of the circuit for generally controlling radio communication modes compared with the case where the wait operation according to the second radio communication mode is performed entirely independent of the wait operation according to the first radio communication mode. This reduces the power consumption of the control circuit, thus correspondingly extending the battery life.

In order to attain the second aspect of the invention, a third aspect of the invention provides a mobile radio communication terminal comprising: first communication means for operating a first radio communication mode with a first operation period depending on a distant apparatus; second communication means for operating a second radio communication mode with a second operation period which can be set by an originating apparatus; and communication period setting means for setting the second operation period which does not overlap with the first operation period.

Specifically, the mobile radio communication terminal according to the third aspect of the invention is configured so that, via the communication period setting means, the timing of the radio communication slot according to the second radio communication mode can be set in synchronization with the end timing of the radio communication slot according to the first radio communication mode.

According to the third aspect of the invention, the radio communication operation is performed so that the operation according to the second radio communication mode does not overlap the operation according to the first radio communication mode in time. Thus the power supply circuit does not have to simultaneously feed power to both the radio circuit for the first radio communication mode and the radio circuit for the second radio communication mode but has to be equipped with power capacity large enough to feed power to either of these radio circuits. This suppresses an increase in the capacity of the power supply circuit and downsizes the power supply circuit and any special anti-heating measure is not required. This realizes a compact and low-cost apparatus.

DETAILED DESCRIPTION OF THE PREFERRED EMBODIMENTS

Embodiments of the invention will be described below with reference to drawings.

First Embodiment

Figure 1:
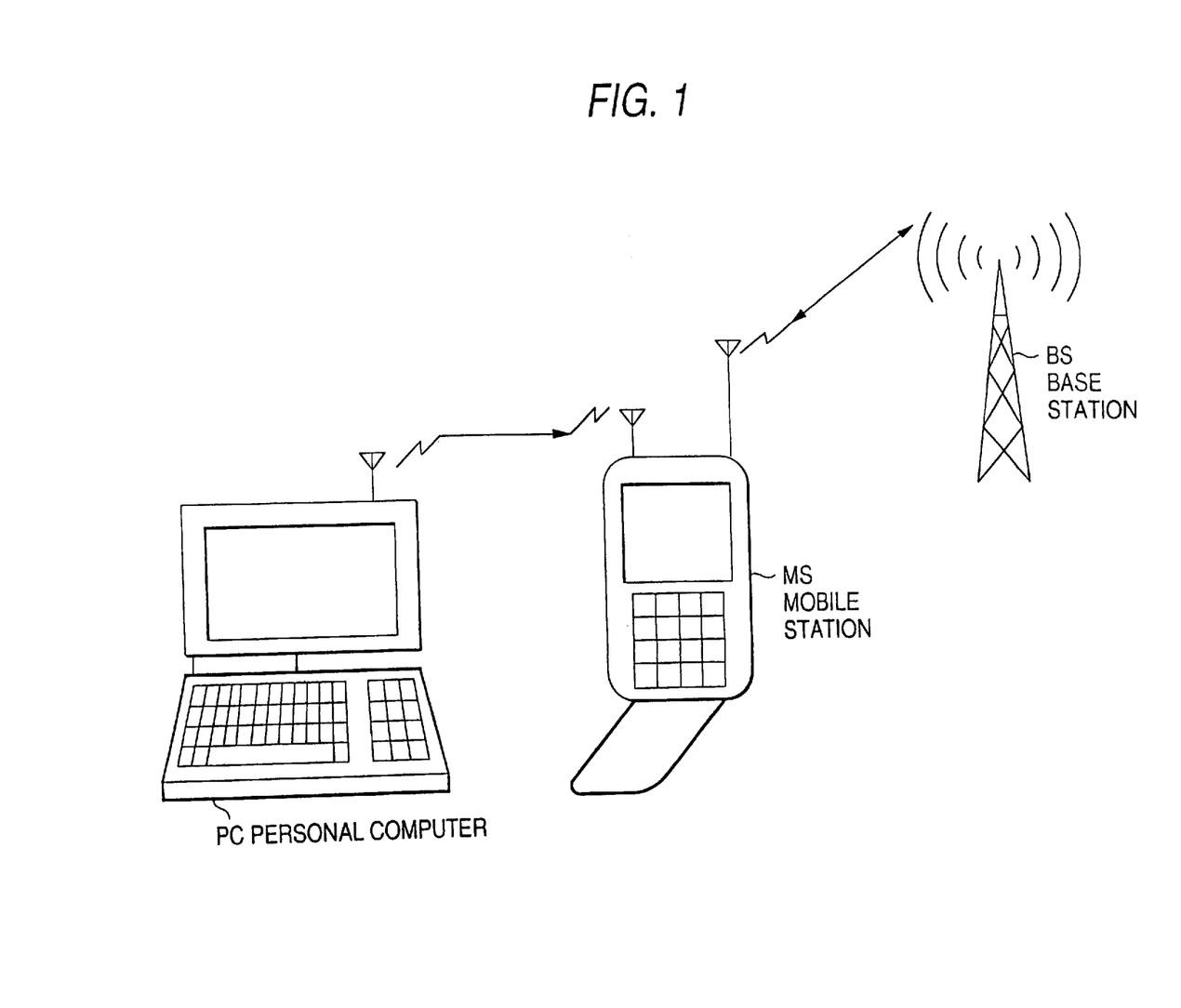
FIG. 1 is a schematic block diagram of an embodiment of a mobile communication system using a mobile radio communication terminal according to the invention.

FIG. 1 is a schematic block diagram of an embodiment of a mobile communication system using a mobile radio communication terminal according to the invention.

A mobile station MS is equipped with the radio communication feature via the W-CDMA (Wideband-Code Division Multiple Access) system and the radio communication feature via the BT (Bluetooth) system. The W-CDMA (Wideband-Code Division Multiple Access) system enables high-speed, large-capacity multimedia mobile communications by using a bandwidth of, for example, 5 MHz in the 2 GHz band. This system establishes synchronization with base stations (BSs) distributed in the service area before it initiates communications. The CDMA system is used as a radio access system between a base station and a mobile station. Three systems, DS-FDD (Direct Sequence-Frequency Division Duplex), MC-FDD (Multi Carrier-Frequency Division Duplex), and TDD (Time Division Duplex), are selectively used as an upstream and downstream multiplex communication systems.

In contrast, the BT system uses the ISM band in the 2.4 GHz band to perform radio communication within a distance of 10 meters via a weak signal of 10 mW (max. 100 mW). This system is used to connect a personal computer (PC) with a peripheral unit such as a printer and to connect a mobile station MS with a laptop personal computer (PC). In the MT system, the frequency hopping is used as a radio communication system in which the hopping frequency is set to 1600 hops/second, in order to assure operability of apparatus in a noisy environment. Radio communications via an asynchronous channel to the distant party are possible, with the overall transfer rate reaching 1 Mbps.

In the BT system, up to eight units can be connected within the use range of 10 meters. These units forms a network called Piconet, in which a unit serves as a master unit and the other as slave units. For units in the Piconet, connection authentication is made via a secret number called PIN (Personal Identification Number) code.

Figure 2:
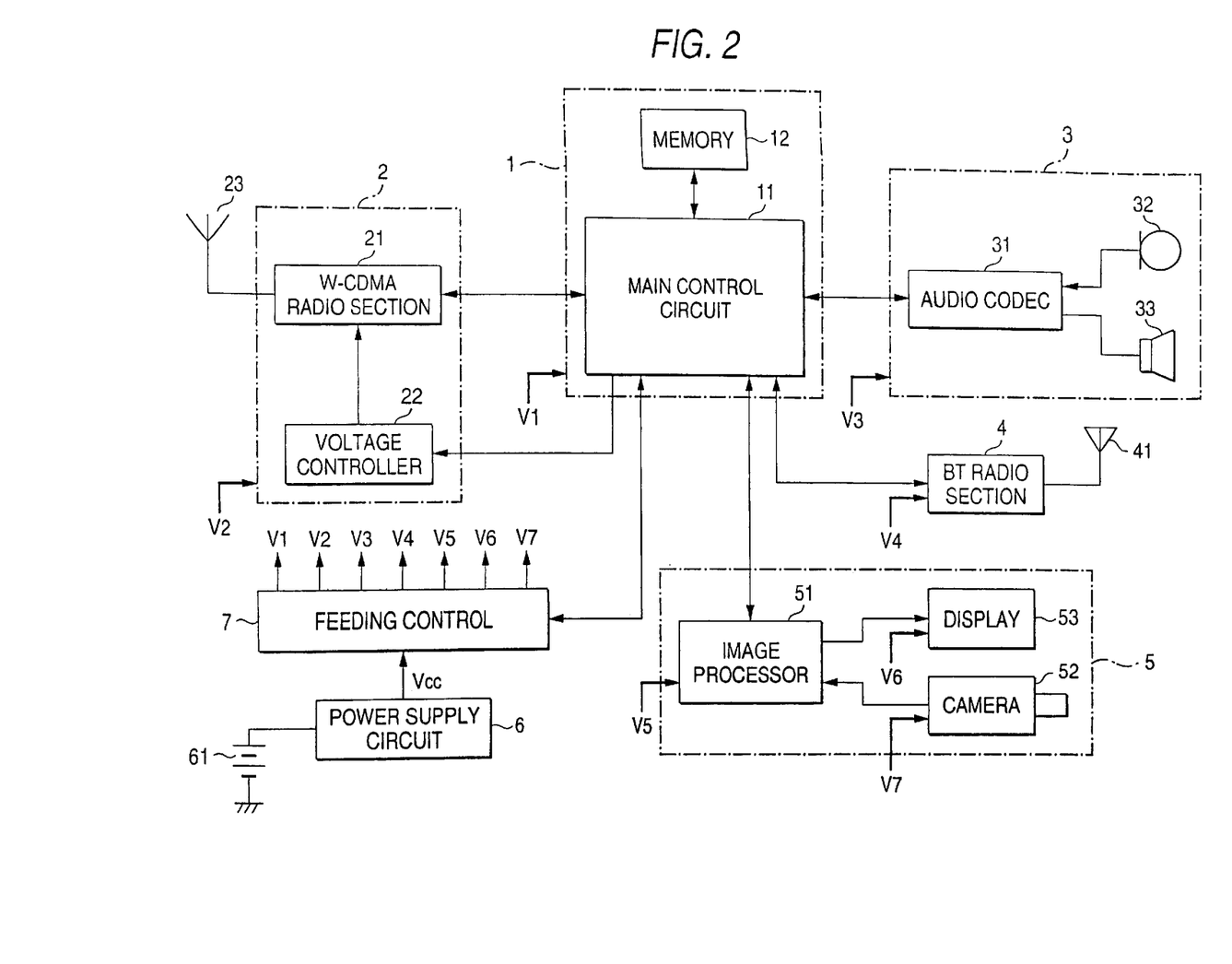
FIG. 2 is a circuit block diagram showing a configuration of a mobile station as the first embodiment of a mobile radio communication terminal according to the invention.

A mobile radio communication terminal equipped with two radio communication system, W-CDMA system and BT system, is configured, for example, as described below. FIG. 2 is a circuit block diagram showing such a configuration.

The apparatus in FIG. 2 includes a control unit 1, a W-CDMA radio unit 2, a speech unit 3, a BT radio section for 4, an image processing unit 5, a power supply circuit 6 which generates an operating voltage Vcc based on the output of a battery 61, and a feeding controller 7.

The control unit 1 comprises a main control circuit 11 having a CPU, and a memory 12. The main control circuit 11 controls each internal section of the apparatus to generally control plural types of radio communication modes via the W-CDMA system, plural types of radio communication modes via the BT system, and a non-communication operation modes such as voice recording and playback. The memory 12 is used to store data to be sent or data received via the W-CDMA system and BT system.

A W-CDMA radio unit 2 includes a W-CDMA radio section 21 and a voltage controller 22. The W-CDMA radio section 21 transmits/receives a CDMA signal to/from a base station BS via an antenna 23, according to the W-CDMA system. The chip rate of the diffusion code is set to 4.096 Mcps and the QPSK system is used as a primary modulation system. The voltage controller 22 controls the transmission level of CDMA signals transmitted from the W-CDMA radio section 21, according to the instruction from the main control circuit 11.

The speech unit 3 includes an audio CODEC 31, a microphone 32 and a receiver 33. The audio CODEC 31 encodes a send speech sound signal input from the microphone 32 according to a predetermined audio encoding system as well as decodes a receive signal input from the W-CDMA radio section 21 via the main control circuit 11 to convert the signal to a receive speech signal and outputs the signal from the receiver in a louder fashion.

The BT radio section 4 transmits/receives a radio signal to/from a personal computer (PC) via the BT system. An antenna 41 is used to transmit/receive a radio signal via the BT system.

The image processing unit 5 comprises a image processor 51, a camera 52 which uses CCD or CMOS solid image pickup element, and a display 53 which uses an LCD. The image processor 51 applies encoding processing such as encoding to an image signal picked up by the camera 52, and inputs the resulting image signal to the control unit 1 for television (TV) telephone communications and image data communications using the W-CDMA system. At the same time, the image processor 51 decodes receive image data or image data stored in the memory 12 to display the resulting signal on the display 53.

Figure 3:
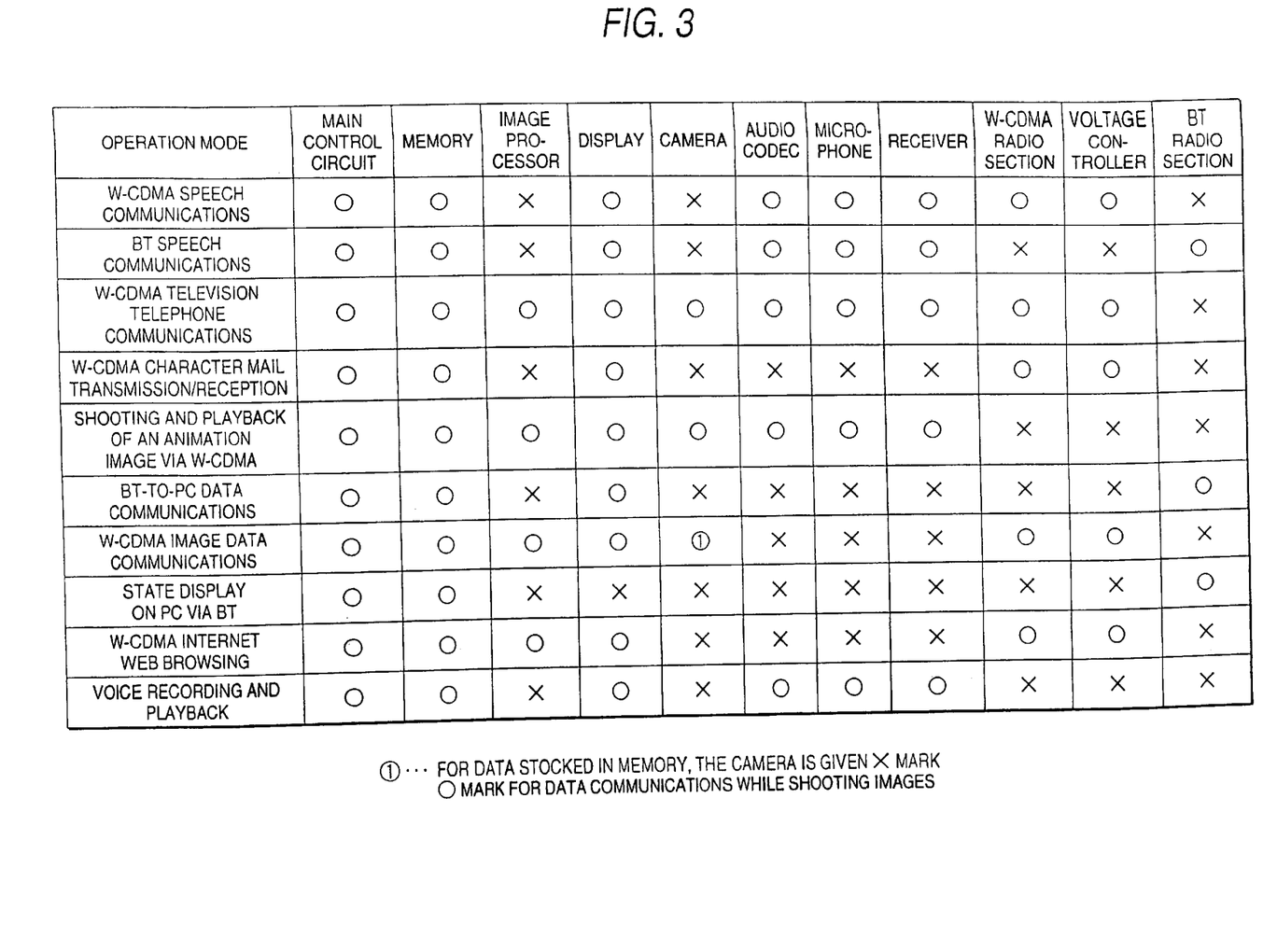
FIG. 3 shows information stored in the feeding control table provided in the apparatus shown in FIG. 2.

The feeding controller 7 includes a feeding control table which stores on/off state of the power to each circuit, in correspondence with all operation modes for the apparatus. FIG. 3 shows an exemplary configuration of the feeding control table. The feeding controller 7 individually turns on/off the operation voltage Vcc output from a power supply circuit 61 to the control unit 1, the radio unit 2, the speed unit 3, the BT radio unit 4 and the image processing unit 5, based on the operation mode reported from the main control circuit 11 and the description of the feeding control table.

Next, the feeding control operation of the apparatus configured as mentioned earlier will be described blow. FIGS. 4 to 7 are flow charts showing the feeding control procedures by the feeding controller 7 and the corresponding control details.

Figure 4:
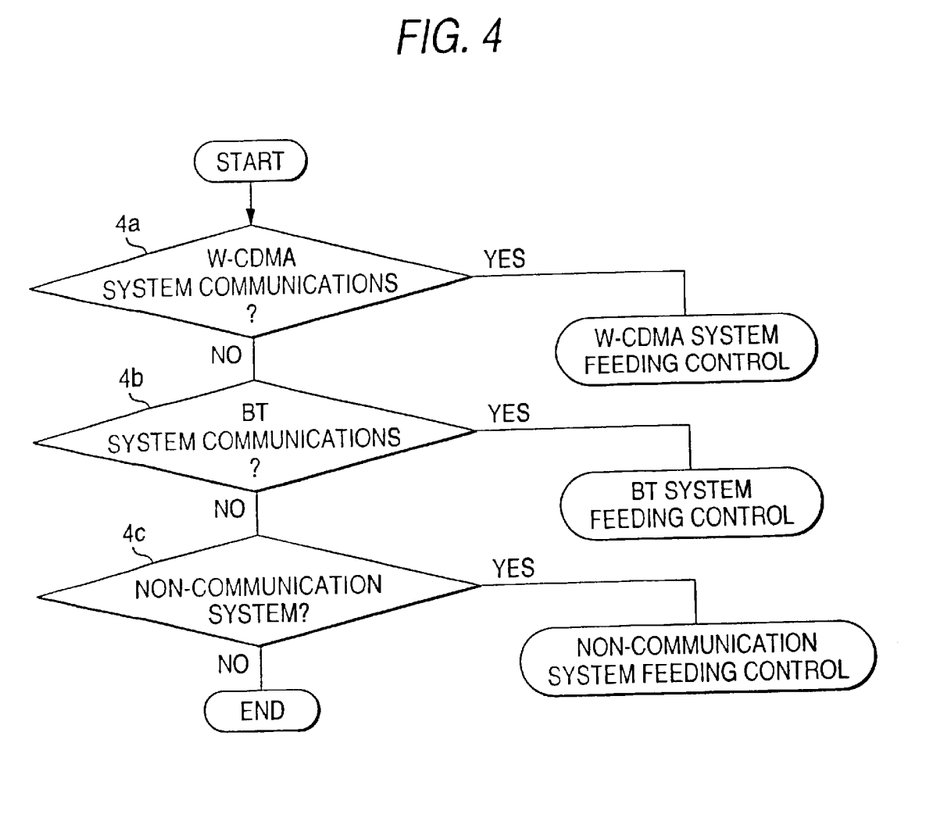
FIG. 4 is a flow chart showing the operating mode decision procedure by the feeding controller of the apparatus shown in FIG. 2.

In steps 4a, 4b, and 4c, the feeding controller 7 repeatedly supervises whether the W-CDMA system communication operation mode, BT system communication operation mode, or non-communication operation mode is reported from the main control circuit 11.

Figure 5:
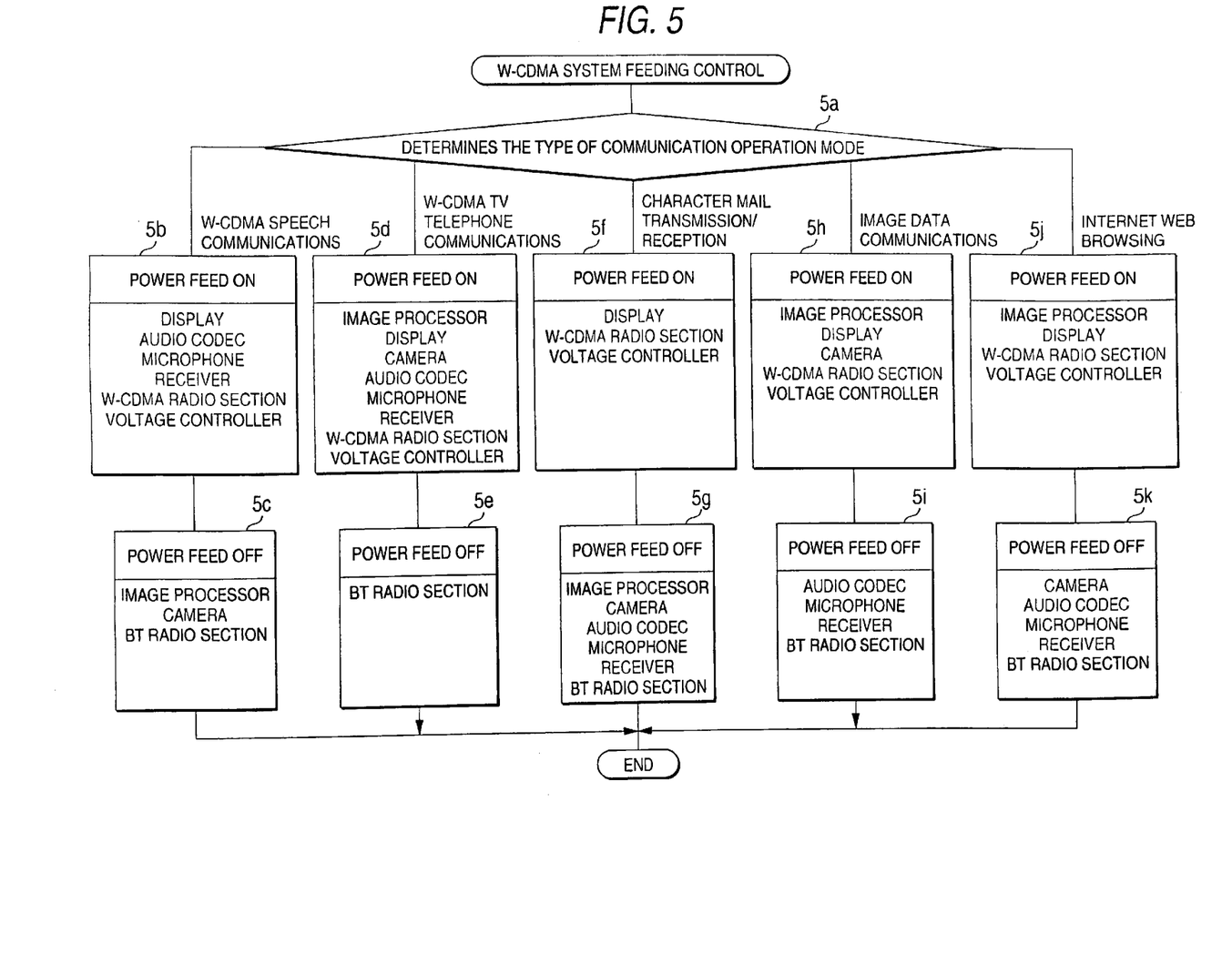
FIG. 5 is a flowchart showing the feeding control procedure in the W-CDMA system mode for the apparatus shown in FIG. 2 and the corresponding details.

In this state, it is assumed that the W-CDMA system communication operation mode is reported from the main control circuit 11 while the apparatus is starting W-CDMA communication. The feeding controller 7 will execute W-CDMA system feeding control as described below. That is, the feeding controller 7 first determines the type of the communication mode in step 5a, as shown in FIG. 5.

As a result of this decision, if the type of the communication mode to be entered is, for example, "W-CDMA speech communications," in step 5b, the feeding controller 7 feeds power to the minimum circuits necessary for W-CDMA speech communication. In step 5c, the feeding controller 7 turns off or considerably reduces power to the circuits not necessary for W-CDMA speech communications. Specifically, the feeding controller 7 feeds power to the display 53, the audio CODEC 31, the microphone 32, the receiver 33, the W-CDMA radio section 21 and the voltage controller 22 while turning off or considerably reduces power to the camera 52 and the BT radio section 4.

In the case of the "W-CDMA television telephone communication," instep 5d, the feeding controller 7 feeds power to the image processor 51, the display 53, the camera 52, the audio CODEC 31, the microphone 32, the receiver 33, the W-CDMA radio section 21 and the voltage controller 22, and in the meantime, in step 5e, turns off or considerably reduces power to the BT radio section 4.

In the case of the "W-CDMA character mail transmission/reception," in step 5f, the feeding controller 7 feeds power to the display 53, the W-CDMA radio section 21 and the voltage controller 22, and in the meantime, in step 5g, turns off or considerably reduces power to the image processor 51, the camera 52, the audio CODEC 31, the microphone 32, the receiver 33, and the BT radio section 4.

In the case of the "W-CDMA image data communications," in step 5h, the feeding controller 7 feeds power to the image processor 51, the camera 52, the display 53, the W-CDMA radio section 21 and the voltage controller 22, and in the meantime, in step 5i, turns off or considerably reduces power to the audio CODEC 31, the microphone 32, the receiver 33, and the BT radio section 4.

Similarly, in the case of the "W-CDMA Internet web browsing," in step 5j, the feeding controller 7 feeds power to the image processor 51, the display 53, the W-CDMA radio section 21 and the voltage controller 22, and in the meantime, instep 5k, turns off or considerably reduces power to the camera 52, the audio CODEC 31, the microphone 32, the receiver 33, and the BT radio section 4.

In this way, there is provided an optimum control of power to each circuit in each communication operation mode of the W-CDMA system.

Figure 6:
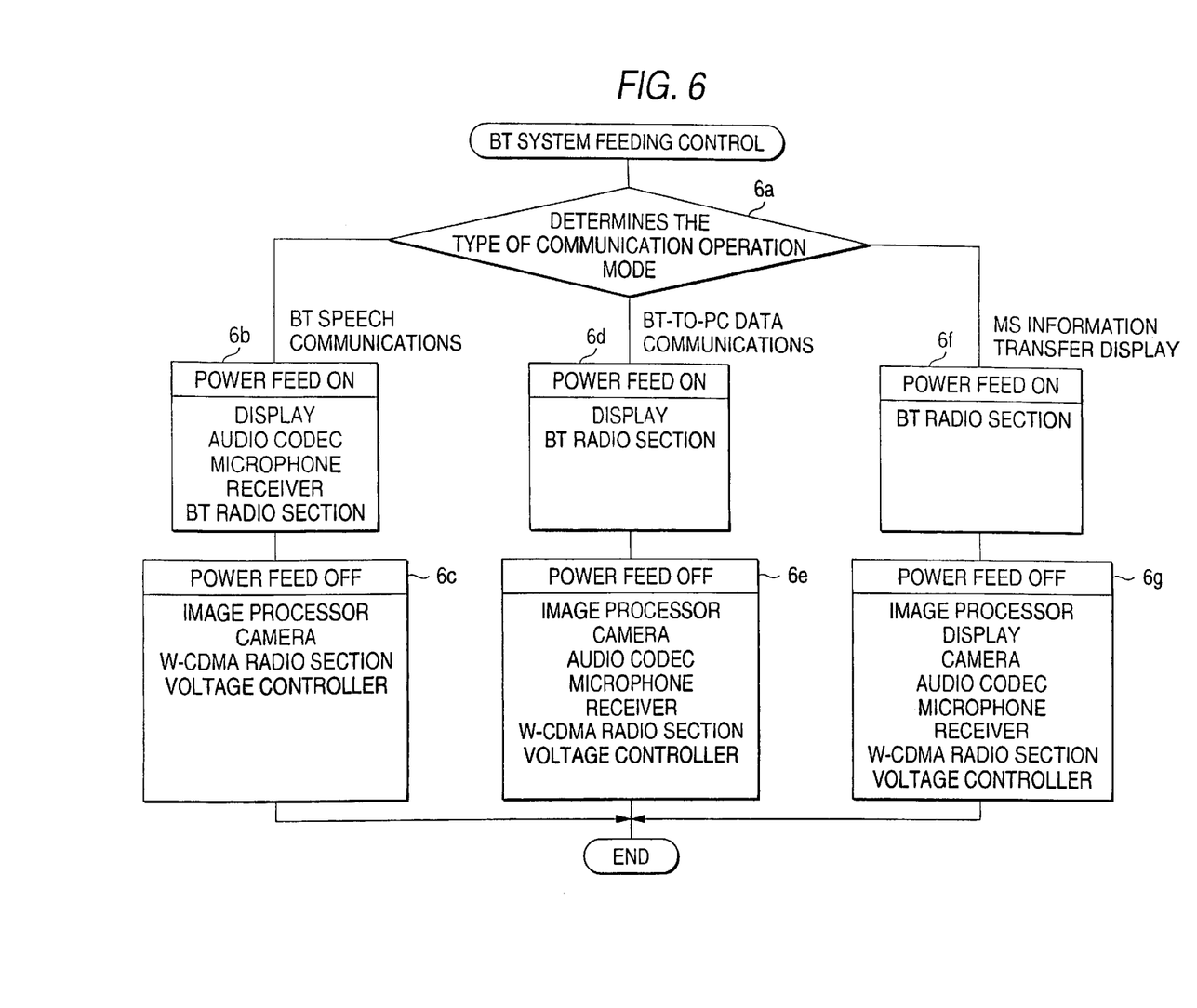
FIG. 6 is a flowchart showing the feeding control procedure in the BT system mode for the apparatus shown in FIG. 2 and the corresponding details.

Next, it is assumed that the BT system communication operation mode is reported from the main control circuit 11 while the apparatus is starting BT communications with a personal computer (PC). The feeding controller 7 will execute BT system feeding control as described below. That is, the feeding controller 7 first determines the type of the communication mode in step 6a, as shown in FIG. 6.

As a result of this decision, if the type of the communication mode to be entered is, for example, "BT speech communication," in step 6b, the feeding controller 7 feeds power to the minimum circuits necessary for BT speech communications. In step 6c, the feeding controller 7 turns off or considerably reduces power to the circuits not necessary for BT speech communications. Specifically, the feeding controller 7 feeds power to the display 53, the audio CODEC 31, the microphone 32, the receiver 33 and the BT radio section 4 while turning off or considerably reduces power to the image processor 51, the camera 52, the W-CDMA radio section 21 and the voltage controller 22.

In the case of the "BT data communications between a mobile station MS and a personal computer (PC)," instep 6d, the feeding controller 7 feeds power to the display 53 and the BT radio section 4, and in the meantime, in step 6e, turns off or considerably reduces power to the image processor 51, the camera 52, the audio CODEC 31, the microphone 32, the receiver 33, the W-CDMA radio section 21 and the voltage controller 22.

Similarly, in the case of the "Information transfer display on a mobile station MS using BT" in which information including the signal receiving quality of the mobile station MS and the residual battery life is transferred to a personal computer (PC) for display, in step 6f, the feeding controller 7 feeds power to the BT radio section alone, and in the meantime, in step 6g, turns off or considerably reduces power to the image processor 51, the display 53, the camera 52, the audio CODEC 31, the microphone 32, the receiver 33, the W-CDMA radio section 21 and the voltage controller 22.

In this way, there is provided an optimum control of power to each circuit in each communication operation mode of the BT system.

Figure 7:
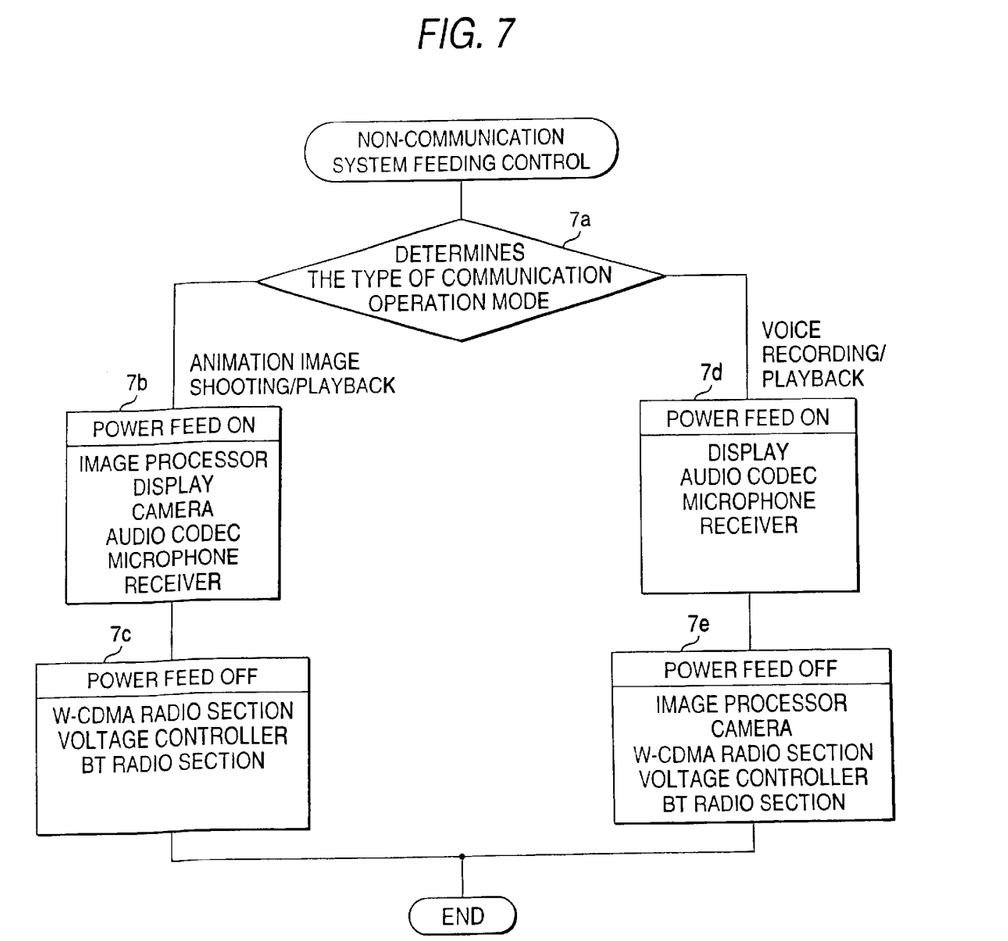
FIG. 7 is a flowchart showing the feeding control procedure in the non-communication system mode for the apparatus shown in FIG. 2 and the corresponding details.

Finally, it is assumed that the non-communication system operation mode is reported from the main control circuit 11 while the apparatus is starting the operation mode without communications. The feeding controller 7 will execute non-communications feeding control. That is, the feeding controller 7 first determines the type of the communication mode in step 7a, as shown in FIG. 7.

As a result of this decision, if the type of the communication mode to be entered is, for example, "Shooting and playback of an animation image," in step 7b, the feeding controller 7 feeds power to the minimum circuits necessary for shooting or playback of an animation image. In step 7c, the feeding controller 7 turns off or considerably reduces power to the circuits not necessary for shooting or playback of an animation image. Specifically, the feeding controller 7 feeds power to the image processor 51, the camera 52, the display 53, the audio CODEC 31, the microphone 32 and the receiver 33 while turning off or considerably reduces power to the BT radio section 4, the W-CDMA radio section 21 and the voltage controller 22.

In the case of the "Recording and playback of speech data," in step 7d, the feeding controller 7 feeds power to the display 53, the audio CODEC 31, the microphone 32 and the receiver 33, and in the meantime, instep 7e, turns off or considerably reduces power to the image processor 51, the camera 52, the BT radio section 4, the W-CDMA radio section 21 and the voltage controller 22.

In this way, there is provided an optimum control of power in each communication operation mode of the non-communication system.

As stated hereinabove, in the first embodiment, a feeding controller equipped with a feeding control table is provided. The feeding control table 7 which stores on/off of the power to each circuit, in correspondence with all operation modes for the apparatus. In the case where an operation mode reported from the main control circuit 11 before the operation mode is entered, the output of the power supply circuit 6 is fed to the minimum circuits necessary for execution of the operation mode and power to the remaining circuits is shut off or considerably reduced.

Thus, sufficient power required for each operation mode is fed. This allows useless power consumption to be reduced and battery life to be extended in apparatus which selectively uses two radio communication systems, W-CDMA system and BT system.

Second Embodiment

The second embodiment according to the invention takes advantage of the fact that the wait operation period according to the W-CDMA system depends on the timing of frames sent from the base station while the wait operation period according to the BT system can be arbitrarily set by the originating apparatus. The second embodiment shortens the operation time of the CPU of the main control circuit and reduces the power consumption, by setting the wait operation period according to the BT system so that the period coincides with the wait operation period according to the W-CDMA system.

Figure 8:
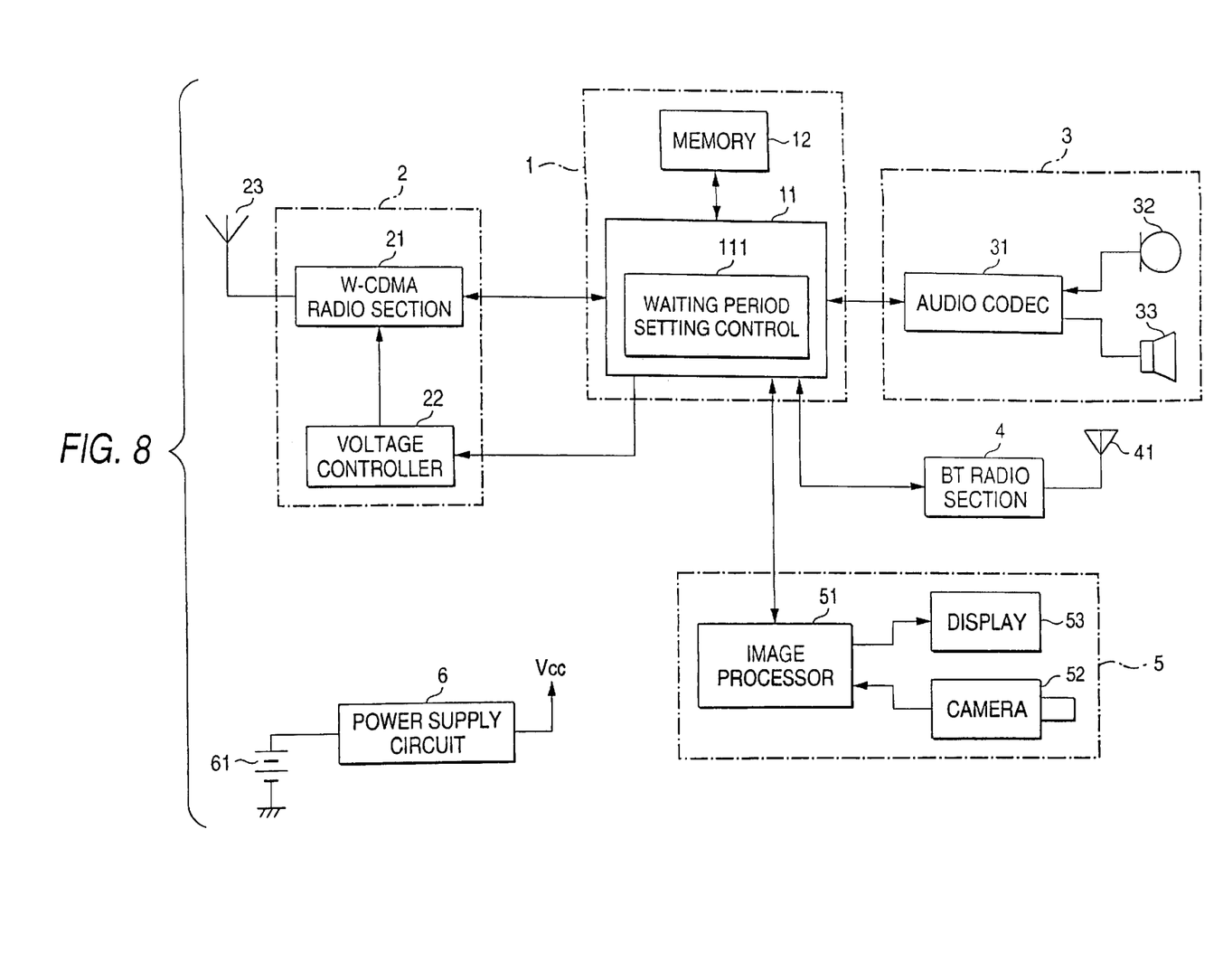
FIG. 8 is a circuit block diagram of a mobile station MS showing the second embodiment of a mobile radio communication terminal according to the present invention.

FIG. 8 is a circuit block diagram of a mobile station MS showing the second embodiment of a mobile radio communication terminal according to the present invention. In FIG. 8, the same portions as those in FIG. 2 are given the same reference numerals/signs and details thereof are not discussed here.

The main control circuit additionally comprises wait period setting control means 111. The wait period setting control means 111 supervises the leading edge of a wait operation period according to the W-CDMA system during intermittent reception in wait operation, and starts the wait operation period according to the BT system in synchronization with the detection timing of the leading edge. The wait period setting control means 111 terminates the wait operation period according to the BT system in synchronization with the trailing edge of the W-CDMA wait operation period.

Figure 9:
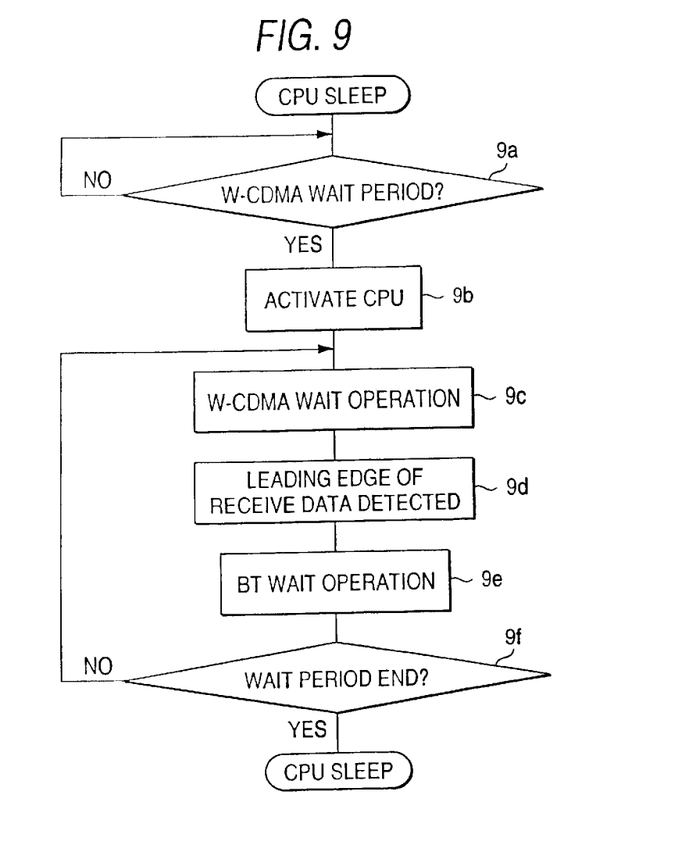
FIG. 9 is a flow chart showing the wait period setting control procedure for the apparatus shown in FIG. 8 and the corresponding details.
Figure 10:
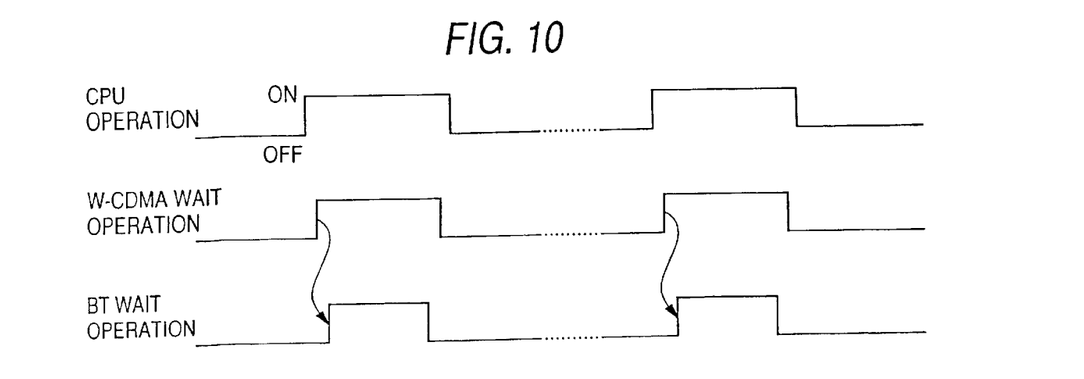
FIG. 10 is a timing diagram showing wait period setting operation for the apparatus shown in FIG. 8.

With the configuration of the main control circuit 11, the CPU in the main control circuit 11 stays in the sleep state in a reception off period of intermittent reception. In this state, as shown in FIG. 9, when the wait operation period set via negotiation with the base station BS is reached, the main control circuit 11 goes from step 9a to step 9b, and in step 9b, the main control circuit 11 activates the CPU and in step 9c, starts the wait operation of the W-CDMA system. When the start timing of the wait operation of the W-CDMA system is detected in step 9d, the wait operation of the BT system is started in step 9e, as shown in FIG. 10. When the end timing of the wait operation of the W-CDMA system is reached, the wait operation of the W-CDMA system and the wait operation of the BT system are both terminated to recover the CPU in the sleep state.

Thus, in the second embodiment, the wait operation of the BT system is performed in parallel with the wait operation of the W-CDMA system in the wait operation period according to the W-CDMA system. This limits the CPU operation period within the wait operation period according to the W-CDMA system. This reduces the CPU power consumption, thus correspondingly extending the battery life, compared with the case where the wait operation according to the BT system is performed entirely independent of the wait operation according to the W-CDMA system.

Third Embodiment

Figure 11:
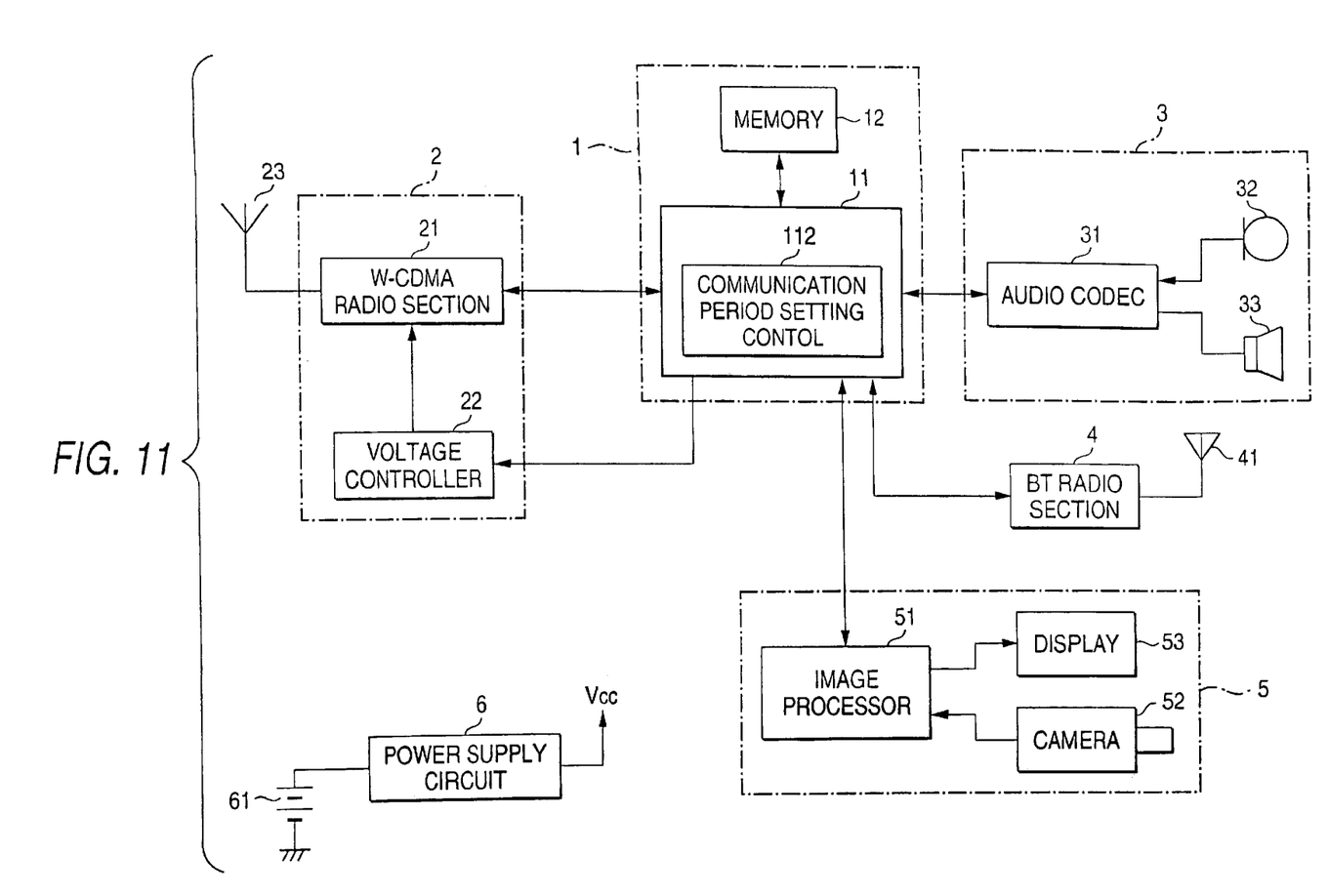
FIG. 11 is a circuit block diagram of a mobile station MS showing the third embodiment of a mobile radio communication terminal according to the present invention.

In the third embodiment of the invention, the sending slot period and the receiving slot period according to the BT system are separately set from the sending slot period and the receiving slot period according to the W-CDMA system respectively in the operation mode in which radio communications via the W-CDMA system is executed in parallel with radio communications via the BT system, thus preventing simultaneous operation of the W-CDMA radio section 21 and the BT radio section 4 to make unnecessary the increase in the capacity of the power supply circuit 6.

FIG. 11 is a circuit block diagram of a mobile station MS showing the third embodiment of a mobile radio communication terminal according to the present invention. In FIG. 11, the same portions as those in FIG. 2 and FIG. 8 are given the same reference numerals/signs and details there of are not discussed here.

The main control circuit additionally comprises communication period setting control means 112. The communication period setting control means 112 supervises the trailing edge of a sending slot and a receiving slot according to the W-CDMA system in case radio communications via the W-CDMA system is executed in parallel with radio communications via the BT system. The communication period setting control means 112 starts the sending slot and the receiving slot according to the BT system in synchronization with the detection timing of the trailing edge.

Figure 12:
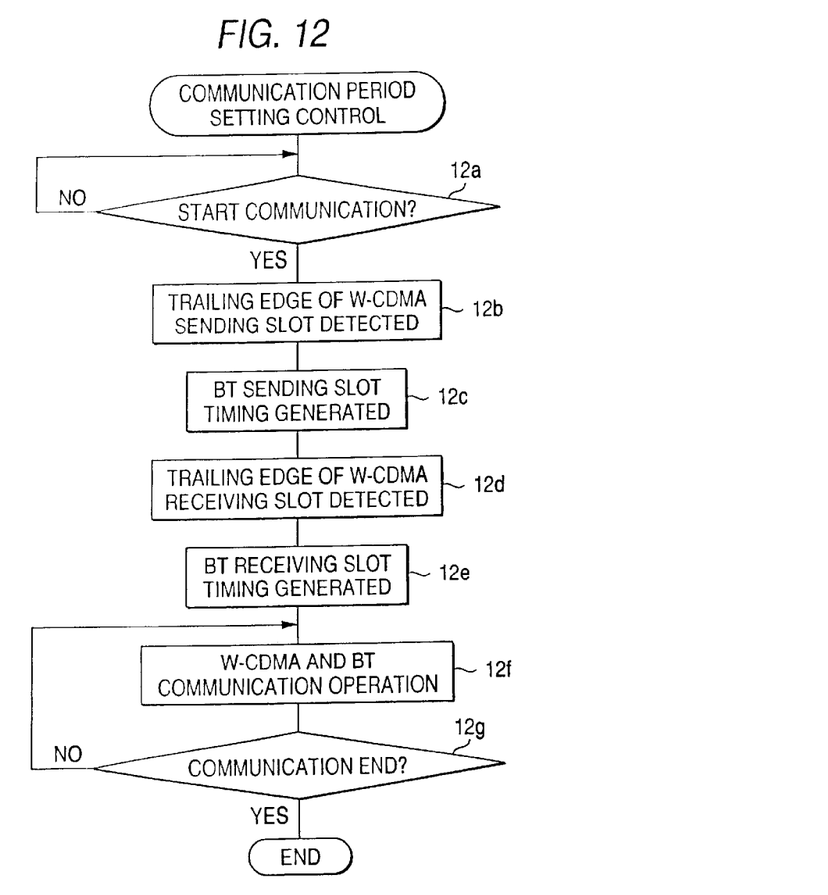
FIG. 12 is a flow chart showing the communication period setting control procedure for the apparatus shown in FIG. 11 and the corresponding details.

With the configuration of the main control circuit 11, when a radio communication operation according to the W-CDMA system starts, as shown in FIG. 12, the main control circuit 11 goes from step 12a to step 12b, and in step 12b, the main control circuit 11 supervises the trailing edge of a W-CDMA sending slot. When the trailing edge is detected, in step 12c, the main control circuit 11 generates the timing of the sending slot according to the BT system. The main control circuit 11 supervises, in step 12d, the trailing edge of a receiving slot according to the W-CDMA slot and, once the training edge is detected, the main control circuit 11 generates the timing of the receiving slot according to the BT system in step 12e.

Figure 13:
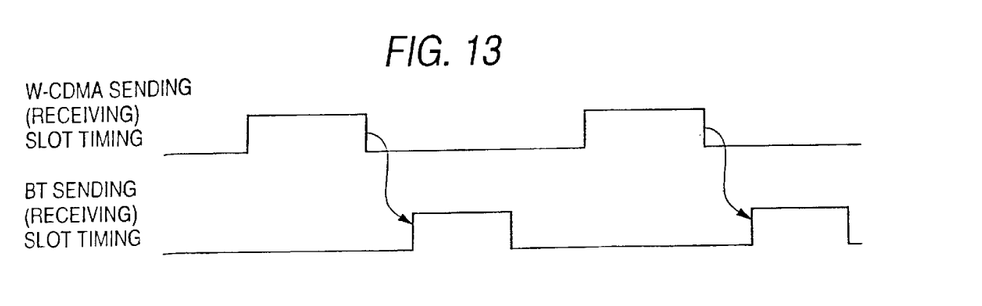
FIG. 13 is a timing diagram showing the sending/receiving slot period setting operation for the apparatus shown in FIG. 11.

According to the sending/receiving slot timing set as mentioned earlier, the apparatus subsequently performs each radio-communications operation according to the W-CDMA system and the BT system. The radio communications operation is repeated until the end of communications is detected in step 12g. FIG. 13 shows the relationship between the slot timing of the sending/receiving operation according to the W-CDMA system and that of the sending/receiving operation according to the BT system.

Thus, in the third embodiment, the slot timing of the sending/receiving operation according to the BT system is set separately from the slot timing of the sending/receiving operation according to the W-CDMA system. This eliminates the need for supplying operation power to the W-CDMA radio section 21 and the BT radio section 4 simultaneously, thus making unnecessary the increase in the capacity of the power supply circuit 6 and upsizing of the power supply circuit and the anti-heating measure in the peripheral circuits. This can prevent upsizing of the apparatus.

Other Embodiments

While the aforementioned embodiments assume a mobile station MS equipped with two radio communication systems, W-CDMA system and BT system, the invention is applicable to a mobile radio communication terminal equipped with another plurality of radio communication systems.

While the leading edge of the wait operation period according to the W-CDMA system is detected and the wait operation period according to the BT system is set in synchronization with the detection timing, timing information of the wait operation period according to the W-CDMA system may be stored in advance and the wait operation period according to the W-CDMA system may be set based on the timing information.

The operations mentioned earlier are applicable to the technique for setting the sending/receiving slot timing mentioned in the third embodiment. That is, the sending slot timing and the receiving slot timing according to the W-CDMA may be stored in advance and the sending slot timing and the receiving slot timing according to the BT system may be set based on the timing information.

Various modifications to the types and configuration of a mobile radio communication terminal, types of operation modes and detailed feeding control procedures can be made without departing from the scope and spirit of the invention.

As detailed earlier, in the first aspect of the invention, communicating means corresponding to the specified radio communication system is selected prior to radio communications, and power is supplied to the selected communicating means alone and power to the non-selected communicating means is shut off or reduced.

In the second aspect of the invention, via communication period setting means, at least part of the wait operation period according to the second radio communication system wherein the radio communication period can be arbitrarily set by the originating apparatus coincides with the wait operation period according to the first radio communication system wherein the radio communication period depends on the distant apparatus. According to the se aspects, a mobile radio communication terminal is provided wherein an increase in power consumption can be minimized and battery life can be extended.

In the third aspect of the invention, via communication period setting means, the radio communication period according to the second radio communication system is set separately from the radio communication period according to the first radio communication system.

According to the third aspect of the invention, a mobile radio communication terminal is provided wherein an increase in the capacity of the power supply circuit is suppressed and large-sized apparatus design is prevented.

FIG. 1
   1: PC Personal computer
   2: MS Mobile station
   3: BS Base station FIG. 3
   1: Operation mode
   2: Main control circuit
   3: Memory
   4: Image processor
   5: Display
   6: Camera
   7: Audio CODEC
   8: Microphone
   9: Receiver
   10: W-CDMA radio section
   11: Voltage controller
   12: BT radio section
   13: W-CDMA speech communications
   14: BT speech communications
   15: W-CDMA television telephone communications
   16: W-CDMA character mail transmission/reception
   17: Shooting and playback of an animation image via W-CDMA
   18: BT-to-PC data communications
   19: W-CDMA image data communications
   20: State display on PC via BT
   21: W-CDMA Internet web browsing
   22: Voice recording and playback
   23: 1: For data stocked in memory, the camera is given x mark.
   o mark for data communications while shooting images.

FIG. 4
   Start
   4a: W-CDMA system communications?
   4b: BT system communications?
   4c: Non- communication system?
   End
   1: W-CDMA system feeding control
   2: BT system feeding control
   3: Non-communication system feeding control FIG. 5
   1: W-CDMA system feeding control
   2: W-CDMA speech communications
   3: W-CDMA TV telephone communications
   4: Character mail transmission/reception
   5: Image data communications
   6: Internet web browsing
   5a: Determines the type of communication operation mode
   5b: Power feed ON
   Display Audio CODEC
   Microphone
   Receiver W-CDMA radio section
voltage controller
5c: Power feed OFF
Image processor
Camera
BT radio section
5d: Power feed ON
Image processor
Display
Camera
Audio CODEC
Microphone
Receiver
W-CDMA radio section
voltage controller
5e: Power feed OFF
BT radio section
5f: Power feed ON
Image processor
Display
Camera
Audio CODEC
Microphone
Receiver
W-CDMA radio section
Voltage controller
5e: Power feed OFF
BT radio section
5f: Power feed ON
Display
W-CDMA radio section
Voltage controller
5g: Power feed OFF
Image processor
Camera
Audio CODEC
Microphone
Receiver
BT radio section
5h: Power feed ON
Image processor
Display
Camera
W-CDMA radio section
Voltage controller
5i: Power feed OFF
Audio CODEC
Microphone
Receiver
BT radio section
5j: Power feed ON
Image processor
Display
W-CDMA radio section
Voltage controller
5k: Power feed OFF
Camera
Audio CODEC
Microphone
Receiver
BT radio section
7: End FIG. 6
1: BT system feeding control
2: BT speech communications
3: BT-to-PC data communications
4: MS information transfer display
5: End
6a: Determines the type of communication operation mode
6b: Power feed ON
Display
Audio CODEC
Microphone
Receiver
BT radio section
6c: Power feed OFF
Image processor
Camera
BT radio section
Voltage controller
6d: Power feed ON
Display
BT radio section
5e: Power feed OFF
Image processor
Camera
Audio CODEC
Microphone
Receiver
W-CDMA radio section
Voltage controller
6f: Power feed ON
BT radio section
6g: Power feed OFF
Image processor
Display
Camera
Audio CODEC
Microphone
Receiver
W-CDMA radio section
Voltage controller FIG. 7
1: Non-communication system feeding control
2: Animation image shooting/playback
3: Voice recording/playback
4: End
7a: Determines the type of communication operation mode
7b: Power feed ON
Image processor
Display Camera
Audio CODEC
Microphone
Receiver
7c: Power feed OFF
W-CDMA radio section
Voltage controller
BT radio section
7d: Power feed ON
Display
Audio CODEC
Microphone
Receiver
7e: Power feed OFF
Image processor
Camera
W-CDMA radio section
Voltage controller
BT radio section
FIG. 9
CPU sleep
9a: W-CDMA wait period?
9b: Activate CPU
9c: W-CDMA wait operation
9d: Leading edge of receive data detected
9e: BT wait operation
9f: Wait period end?
CPU sleep
FIG. 10
CPU operation ON OFF
W-CDMA wait operation
BT wait operation
FIG. 12
Communication period setting control
12b: Trailing edge of W-CDMA sending slot detected
12c: BT sending slot timing generated
12d: Trailing edge of W-CDMA receiving slot detected
12e: BT receiving slot timing generated
12f: W-CDMA and BT communication operation
12g: Communication end?
End
FIG. 13
W-CDMA sending (receiving) slot timing
BT sending (receiving) slot timing

What is claimed is:

1. A mobile radio communication terminal, comprising:
first communication means for operating a first radio communication mode with a first radio communication period depending on a distant apparatus;
second communication means for operating a second radio communication mode with a second radio communication period which can be set by an originating apparatus; and
communication period setting means for detecting the start timing of a wait operation of the first communication means and for starting a wait operation period of the second communication means based on the detected timing.

2. The mobile radio communication terminal according to claim 1, wherein:
the communication period setting means starts the wait operation period of the second communication means in synchronization with the wait operation start timing of the first communication means.

3. The mobile radio communication terminal according to claim 1, wherein the second communication means comprises a BT mode.

4. A mobile radio communication terminal according to claim 1, further comprising means for judging the communication mode before a selecting means selects the communication means;
wherein said selecting means selects the communication mode on the basis of a judgment result.

5. A mobile radio communication terminal, comprising:
first communication means for operating a first radio communication mode with a first radio communication period depending on a distant apparatus;
second communication means for operating a second radio communication mode with a second radio communication period which can be set by an originating apparatus; and
communication period setting means for detecting the start timing of a communication operation of the first communication means and for starting a communication operation period of the second communication means based on the detected timing.

6. The mobile radio communication terminal according to claim 5, wherein:
the communication period setting means starts the communication operation period of the second communication means which does not overlap with a communication operation period of the first communication means.

7. The mobile radio communication terminal according to claim 5, wherein the second communication means comprises a BT mode.

8. A mobile radio communication terminal according to claim 5, further comprising means for judging the communication mode before a selecting means selects the communicating means;
wherein said selecting means selects the communication mode on the basis of a judgment result.

9. A mobile radio communication terminal according to claim 5, wherein the communication period includes sending slots and receiving slots, and a start timing of the sending slot in the first communication mode is different from that in the second communication mode and a start timing of the receiving slot in the first communication mode is different from that in the second communication mode.

10. A mobile radio communication terminal, comprising:
a first communicator which operates a first radio communication mode with a first radio communication period depending on a distant apparatus;
a second communicator which operates a second radio communication mode with a second radio communication period which can be set by an originating apparatus; and
a communication period setter which detects the start timing of a wait operation of the first communicator and starts a wait operation period of the second communicator based on the detected timing.

11. A mobile radio communication terminal, comprising:

a first communicator which operates a first radio communication mode with a first radio communication period depending on a distant apparatus;

a second communicator which operates a second radio communication mode with a second radio communication period which can be set by an originating apparatus; and a communication period setter which detects the start timing of a communication operation of the first communicator and starts a communication operation period of the second communicator based on the detected timing.

* * * * *